United States Patent [19]
Brownfield

[11] Patent Number: 5,253,753
[45] Date of Patent: Oct. 19, 1993

[54] DISPLAY CASE

[76] Inventor: Timothy M. Brownfield, 16661 Townhouse Dr., Tustin, Calif. 92680

[21] Appl. No.: 919,224

[22] Filed: Jul. 27, 1992

[51] Int. Cl.⁵ ............................................. B65D 85/57
[52] U.S. Cl. .................................. 206/310; 220/4.24; 220/662; 362/154
[58] Field of Search ............... 206/307, 309, 310, 455; 220/4.21–4.24, 532, 533, 752, 759, 662; 362/86, 87, 154–156

[56] References Cited

U.S. PATENT DOCUMENTS

| | | | |
|---|---|---|---|
| 1,214,477 | 1/1917 | McCormack . | |
| 1,867,323 | 7/1932 | Meyer . | |
| 2,510,629 | 6/1950 | Golden . | |
| 2,511,785 | 6/1950 | Packheiser . | |
| 3,035,364 | 5/1962 | Hoogesteger . | |
| 3,360,152 | 12/1967 | Leers | 220/4.24 |
| 3,554,429 | 1/1971 | Cohen | 220/532 |
| 3,949,872 | 4/1976 | Paudras | 206/310 |
| 3,950,603 | 4/1976 | Brefka | 220/4.21 |
| 3,951,264 | 4/1976 | Heidecker et al. | 206/309 |
| 4,089,464 | 5/1978 | Teti, Jr. et al. | 220/4.21 |
| 4,627,532 | 12/1986 | Clemens | 206/309 |
| 4,697,379 | 10/1987 | McPhaul | 362/156 |
| 4,805,783 | 2/1989 | Mayer . | |
| 4,925,045 | 5/1990 | Logsdon | 220/4.24 |
| 5,135,106 | 8/1992 | Morrone | 206/310 |
| 5,154,291 | 10/1992 | Sur | 362/154 |

FOREIGN PATENT DOCUMENTS 1529853  6/1968  France ............................. 220/4.24

*Primary Examiner*—Jimmy G. Foster
*Attorney, Agent, or Firm*—Edward E. Roberts

[57] ABSTRACT

A display case including first and second display case halves which may be formed individually, or with an integrally formed living hinge portion. Each display case half includes a peripheral edge portion in facing relation with the like edge portion of the other half, the edge portions including matingly coating pegs and apertures, alternately positioned, or located, so that the parts are keyed, one to the other, to form an enclosure with aligned display openings. One end of the case is provided with spaced parallel span rails which define a compartment, into which illumination means may be inserted. The case may be provided with a handle for portability, or may be provided with suitable fasteners for fastening to a fixed member, such as a wall or a ceiling. A centrally located cross member is provided in one embodiment, with a hub for receiving a record aperture thereon. The display openings may be provided with means for receiving transparent or translucent panels or the like.

19 Claims, 4 Drawing Sheets

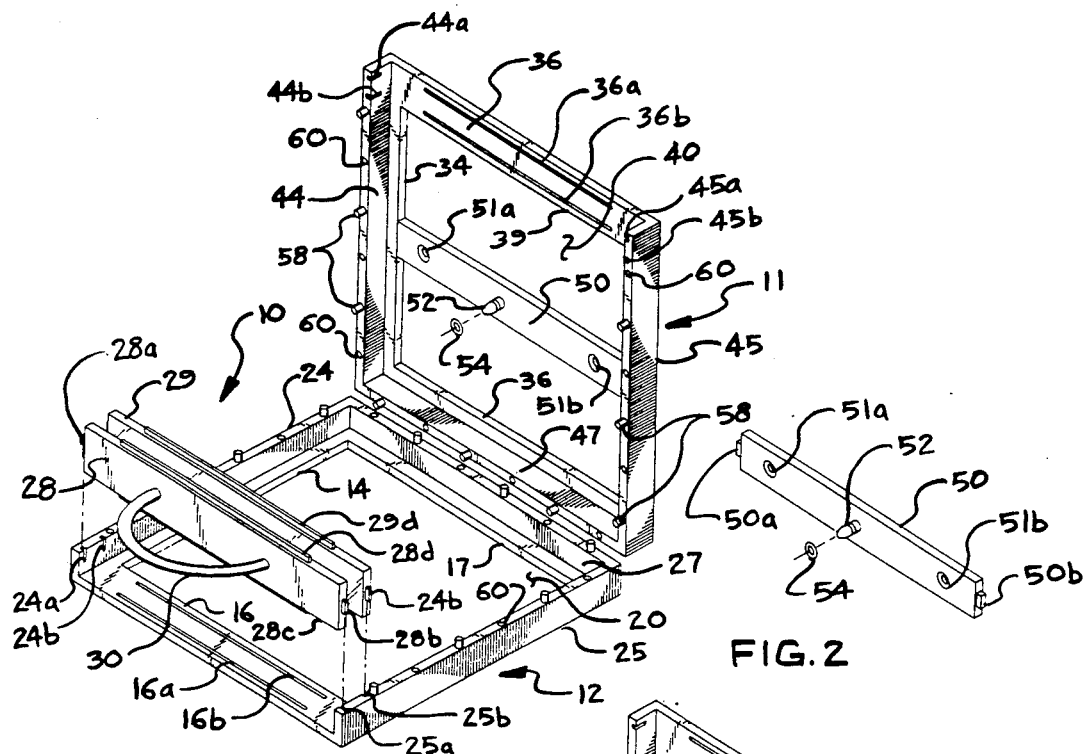
FIG. 1A
FIG. 2
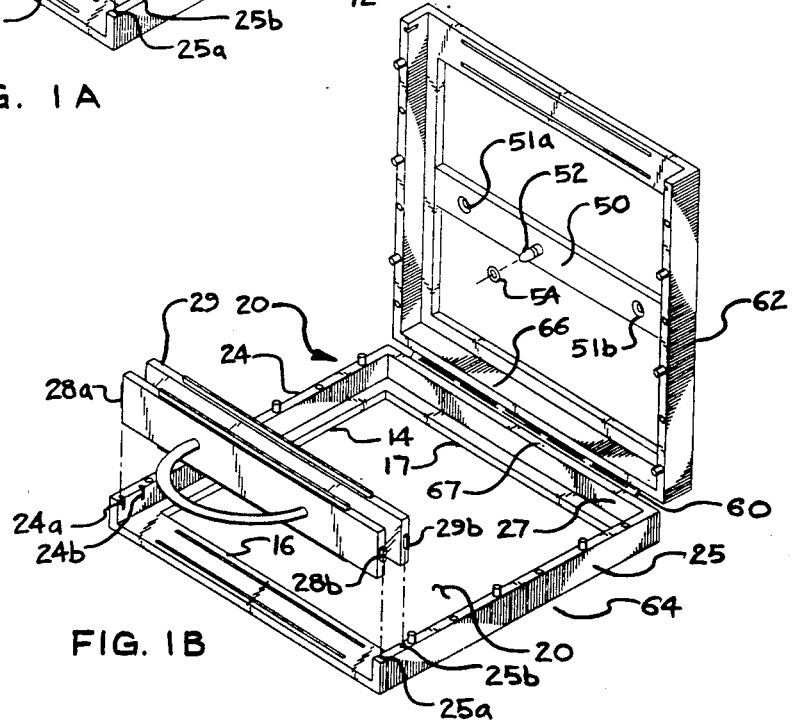
FIG. 1B

DISPLAY CASE

BACKGROUND OF THE INVENTION

The background of the invention will be discussed in two parts.

Field of the Invention

This invention relates to display cases, and more particularly to a case for the display of record albums, photographs, signs and the like.

Description of the Prior Art

Displayed articles are common, not only in the home, but in commercial and retail establishments, and may include anything from signs to photographs to record albums or even curios.

Such display apparatus are shown and described in the following: U.S. Pat. No. 1,214,477, entitled "Photograph Case" issued to McCormack on Jan. 30, 1917; U.S. Pat. No. 1,867,323, entitled "Display Frame" issued to Meyer on Jul. 12, 1932; U.S. Pat. No. 2,510,629, entitled "Picture Frame" issued to Golden on Jun. 6, 1950; U.S. Pat. No. 2,511,785 entitled "Picture Frame" issued to Packheiser on Jun. 13, 1950; U.S. Pat. No. 3,035,364, entitled "Photograph Transparency Mount Adapter" issued to Hoogesteger on May 22, 1962; U.S. Pat. No. 4,041,630 entitled "Frame for Exhibiting Albums and the Like"; and U.S. Pat. No. 4,805,783 entitled "Slat Wall Advertising Panel" issued to Mayer on Feb. 21, 1989.

SUMMARY OF THE INVENTION

In accordance with the present invention, there is provided a display case including first and second display case halves which may be formed individually, or with an integrally formed living hinge portion. Each display case half includes a peripheral edge portion in facing relation with the like edge portion of the other half, the edge portions including matingly coacting pegs and apertures, alternately positioned, or located, so that the parts are keyed, one to the other, to form an enclosure with aligned display openings.

One end of the case is provided with spaced parallel span rails which define a compartment, into which illumination means may be inserted. The case may be provided with a handle for portability, or may be provided with suitable fasteners for fastening to a fixed member, such as a wall or a ceiling. A centrally located cross member is provided in one embodiment, with a hub for receiving a record aperture thereon. The display openings may be provided with means for receiving transparent or translucent panels or the like.

It is thus an aspect of the invention to provide a display case which is economical and simple in construction and flexible in use.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1A is a perspective view, partially exploded, of a display case in accordance with the invention;

FIG. 1B is a perspective view, partially exploded, of an alternative embodiment of the display case of FIG. 1;

FIG. 2 is a perspective view of an album mounting cross member used in embodiments of FIGS. 1A and 1B;

FIG. 4 is a fragmentary end view similar to FIG. 3, depicting mounting bolts or the like;

DESCRIPTION OF THE PREFERRED EMBODIMENT

Figure 3:
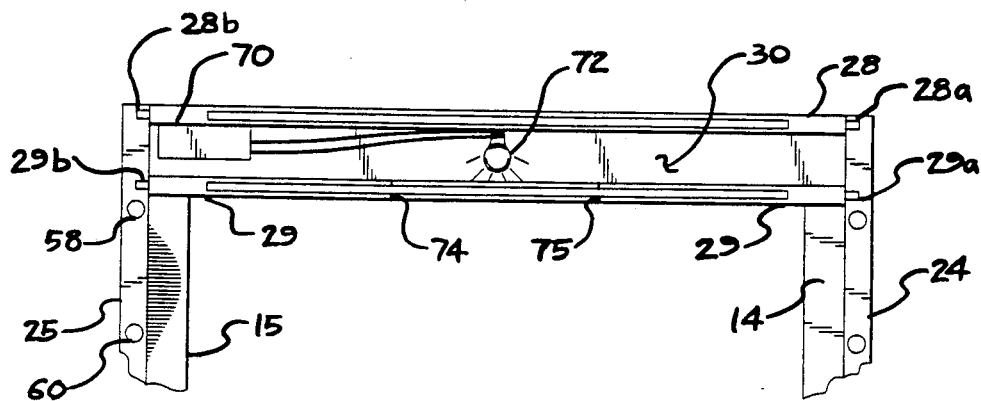
FIG. 3 is a fragmentary end view of the handle or mounting portion of the case of FIGS. 1A and 1B depicting article illumination therefore.

Referring now to the drawings, and particularly to FIGS. 1A and 1B, there are shown first and second embodiments of 10 and 20 of a display case in accordance with the invention. The embodiment of FIG. 1 depicts a display case 10 having separable, generally identically configured display halves, generally designated 11, 12, each having a peripheral edge portion configured for mating engagement with the like peripheral edge portion of the other, for forming an article display enclosure with facing rectangular openings.

Specifically, display half 12 is formed of two side members 14, 15, a top member 16 and a bottom member 17, the four members being interconnected to form a plane having a frame opening 20. Each of the side members 14, 15 and bottom member 17 has attached thereto, or formed integrally therewith, a side rail 24, 25 and 27, respectively, the side rails extending perpendicular to the plane of the members 14–17. In effect, the rails 24, 25 and 27, define the outer periphery of the display case 10 and have a predetermined dimension to define a case having a given depth.

The fourth member 16 provides, in conjunction with the like member from display half 11, an opening for insertion of the displayed article. For closure thereof, first and second span rails 28, 29 are provided, the span rails having a length generally equal to the inside dimension between side rails 24 and 25, with a width generally twice the depth of the rails 24, 25 and 27, this width corresponding to the given inside depth of the display case 10. The opposite ends of the span rails 28 (and 29) are provided with longitudinally extending, aligned, generally centrally positioned projections 28a, 28b, configured for coacting engagement with notches 24a and 25a of the side rails 24, 25, respectively. A similar second set of aligned notches 24b, 15b, are in spaced relation to the first set 24a, 25a, for receiving the projections 29a and its opposite span rails (not visible). As assembled, the two spaced generally parallel span rails 28, 29 form a compartment 30 (See FIGS. 3 and 4) inside the display case 10 at a location which would ordinarily be considered the top, although the case can be oriented in any direction with the compartment 30 in any one of four positions.

The other display half 11 is identically configured, insofar as it includes like members 34-37, defining an opening 40, with side rails 44, 45 and bottom rail 47 generally perpendicular thereto. The span rails 28, 29, fit between the display halves 10, 11, with the facing surfaces of members 16 and 36 having a pair of spaced longitudinally extending grooves 16a, 16b and 36a, 36b, respectively. The outer span rail 28 is provided with a suitable handle 30 for portability, if desired. Opposing long edges of the bar-shaped span rail 28 are provided with tongues 28c, 28d for engaging the respective grooves 16a, 36a. Span rail 29 has a corresponding set of oppositely facing tongues, only one 29d of which is shown, for engaging the grooves 16b and 36b, respectively. Notches 44a, 44b and 45a, 45b are formed for alignment with notches 24a, 24b, and 25a, 25b, respectively, for engaging the projections of span rails 28 and 29 with the parts 11 and 12 joined together.

Spanning the display opening 40 of the display half 11 is a cross member 50, which is shown removed from the assembly in FIG. 2. Cross member 50 is positioned generally centrally relative to the opening 40 in the vertical direction, as viewed in the drawings. The cross member 50 is configured similar to the span rails with projections 50a, 50b extending from opposite edges thereof in alignment with the longitudinal axis. The cross member 50 is provided with apertures 51a, 51b for enabling attachment of the display case 10 to a wall or the like. Attached to the midpoint of the cross member 50 is a hub 52 of a diameter slightly smaller than the diameter of the center of a record 55 (See FIG. 8) which may be secured within the display case by means of an O-ring 54.

For attaching the two display halves 11 and 12 together, the peripheral facing edges thereof are provided with matingly coacting pegs 58 and apertures 60 which are alternately arranged The edges of each of the rails 24, 25 and 27 of half 12, and rails 44, 45 and 47 of display half 11, are provided with a like even number of connectors, half of which are pegs and half of which are apertures, with the pegs being positioned with the apertures in intervening locations. The positions are selected to provide keying of one half to the other, and also, to make the two display halves 11 and 12 identical.

Although the above description describes the individual portions, it is to be understood that the two display halves 11 and 12 may be integrally formed, such as by plastic molding, with the span rails 28 and 29 being formed as separate pieces.

FIG. 1B shows the alternate embodiment 20 in which the two display halves are joined together with an integral living hinge portion 60. In this embodiment, the two halves 62 and 64 are generally identical to the two halves 11 and 12, with the exception of the absence of pegs and apertures on the adjoined rails 66 and 67 which are interconnected by the hinge portion 60. The main portions of the remaining parts have been given the same reference numerals as the embodiment of FIG. 1 for ease of description.

Figure 4:
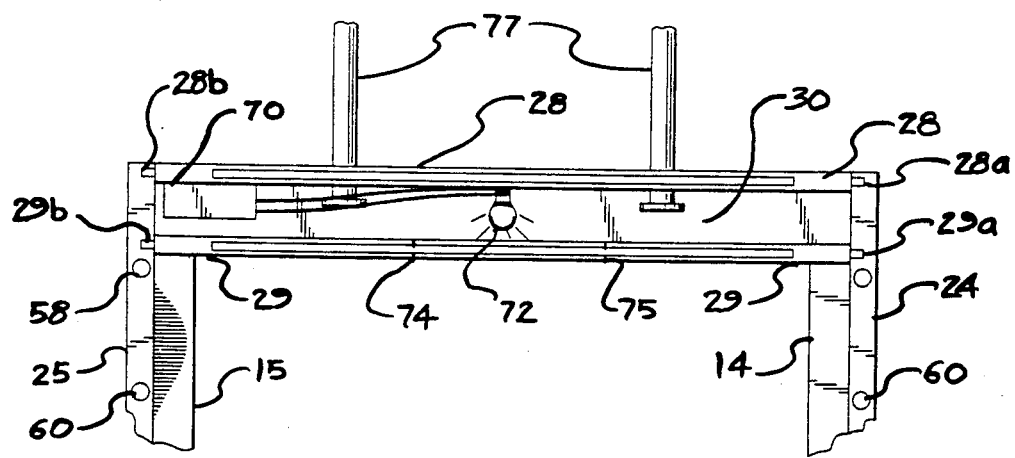

FIGS. 3 and 4 depict the compartment 30 with illumination means in the form of a battery 70 and lamp 72 for casting illumination into the article display portion via a slot formed in span rail 29 between the broken lines 74, 75, Alternatively, a plurality of apertures may be formed in the span rail 29. FIG. 4 depicts an alternate mounting arrangement wherein a pair of fasteners 77, such as nails or the like, may be passed through the upper or outer span rail 28 for attachment to a ceiling or the like.

Figure 5:
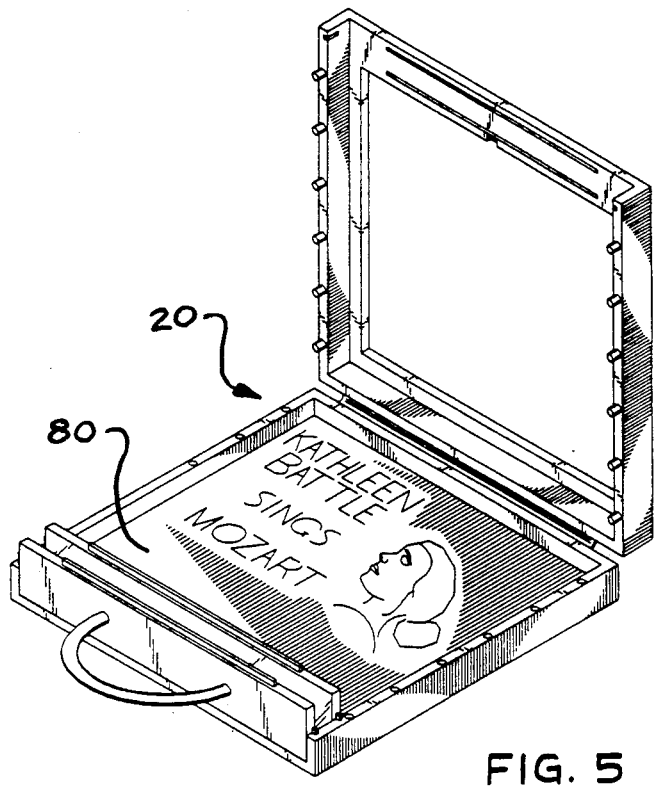
FIG. 5 is a perspective view of the display case of FIG. 1B assembled and with a displayed article therein.
Figure 6:
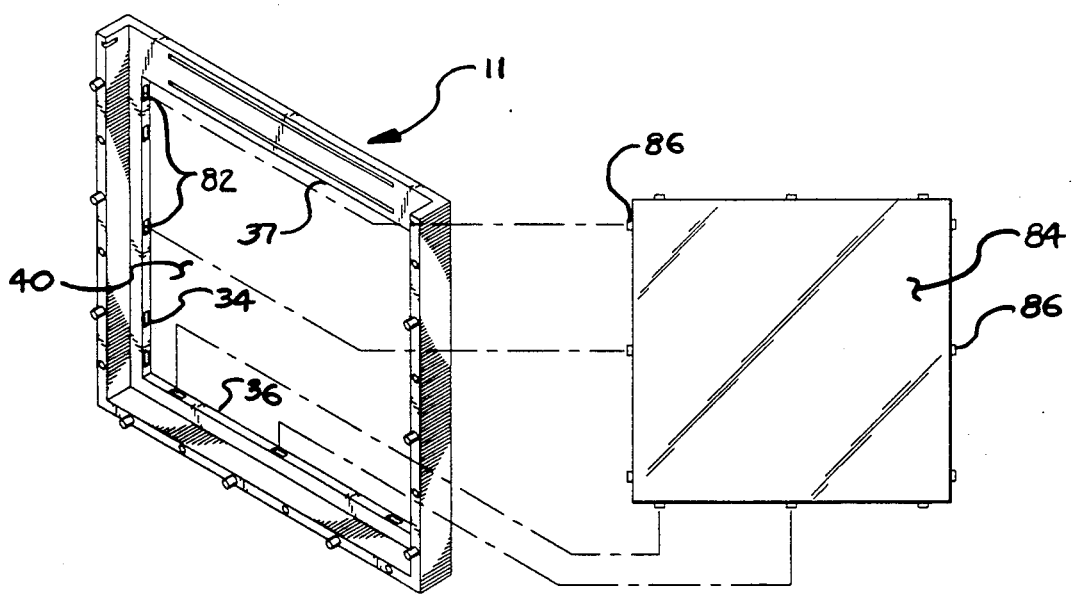
FIG. 6 is a perspective view of a portion of the display case of FIG. 1A with a transparent or diffusing member in exploded relation therewith.

FIG. 5 depicts the display case 20 with an album cover 80 mounted therein. FIG. 6 illustrates a modification to the display case half 11 wherein the peripheral edges of the members 34, 36 and 37 (and the corresponding member 35 opposite member 34) which define display opening 40 ar provided with spaced notches 82 configured, dimensioned and arranged for matingly receiving tabs 86 formed in the outer periphery of a transparent or translucent panel member 84 configured and dimensioned for being received within the display opening 40.

Figure 7:
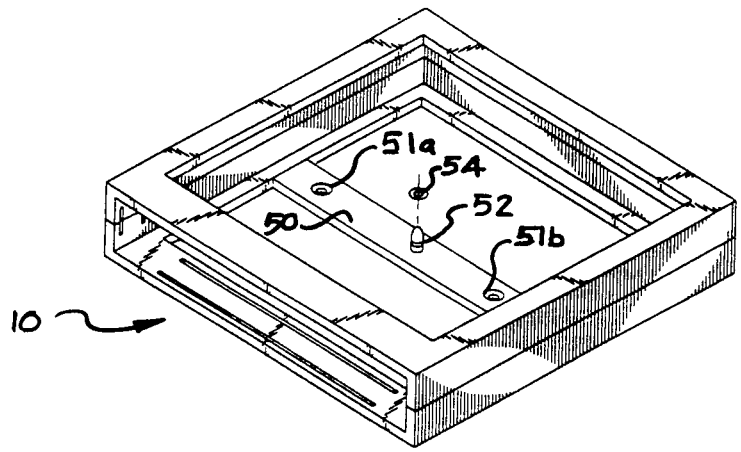
FIG. 7 is a perspective view of the display case of either FIG. 1A or 1B, as assembled, with the closure side thereof removed.
Figure 8:
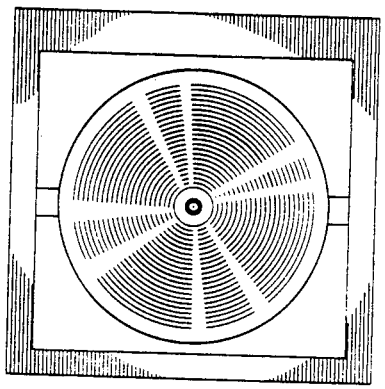
FIG. 8 is a front view of the assembly of FIG. 1A with a record album mounted therein.

FIG. 7 illustrates the display case 10 (or 20) in its closed position to form an enclosure with the spa rails 28 and 29 removed to show the open end thereof. The reference numerals employed are with reference to display case 10, although the view is equally applicable to the display case 20. FIG. 8, previously briefly discussed, depicts shows the display case 10 with a record mounted therein.

Figure 9:
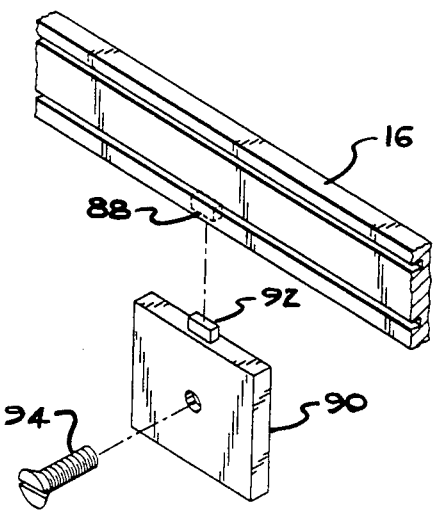
FIG. 9 is an exploded perspective view of a wall mounting bracket for use with the display case of FIG. 1A or 1B.

For alternative mounting purposes, as shown in FIG. 9, a portion of the display case 10, or 20, such as rail 16 (or 36) may be provided with a centrally located notch 88 dimensioned and configured for receiving the tab portion 92 of a mounting block 90, through which a fastener, such as a screw 94 may be inserted for attachment to a flush mounting surface, such as a wall.

In the foregoing description, which terms of orientation with respect to gravity have been used, it is to be understood that such terms have been employed with respect to the views as showing and are not intended to be limiting. In accordance with the invention, there have been shown and described alternate embodiments of a display case 10 or 20, with variants for mounting, illumination, carrying or the like, demonstrating the flexibility of use and application of the invention.

While there has been shown and described a preferred embodiment, various modifications and changes may be made without departing from the true spirit and scope or the invention.

What I claim is:

1. A display case comprising:
   first and second separate generally identical display case halves having interior surfaces and peripheral edge portions in facing relation with the like surfaces and edge portions of the other half, which, when mated together in facing relationship form an enclosure with at least one display opening;
   at least one of said edge portions includes matingly coacting configurations for attaching and aligning said halves: and
   one of said interior surfaces includes means for enabling attachment of an article thereto for display through said display opening.

2. The display case of claim 1 wherein said mated edge portions of the two halves include coacting means arranged and spaced for enabling keying one half to the other for assembly.

3. The display case of claim 2 wherein said first and second halves include hinge means for joining said halves as a unitary assembly.

4. The display case of claim 3 wherein said enclosure has an open end for receiving said article to be displayed, and further includes first and second generally identically configured span rail members, said first rail member being configured for closing said open end and said second rail member being configured for being received within said enclosure in spaced relation with said first member for forming a compartment.

5. The display case of claim 4 wherein said display case includes handle means for transportation thereof and said coacting means for enabling keying includes pegs and apertures.

6. The display case of claim 4 further including illumination means within said compartment.

7. The display case of claim 6 wherein said display case further includes a handle for portability mounted exterior of said compartment.

8. A display case comprising:
first and second generally identical display portions which, when joined together form an enclosure with an open end and at least one display opening;
first and second generally identically configured span rail members, said first rail member being configured for closing said opening and said second rail member being configured for being received within said enclosure in spaced relation with said first member for forming a compartment; and
wherein said first and second portions are molded with an integral living hinge as a unitary assembly.

9. The display case of claim 8 wherein said display case includes two display openings, and wherein said case further includes a cross member secured to the periphery of one of said openings.

10. The display case of claim 9 wherein said cross member includes means for enabling securing said display case to a supporting structure.

11. The display case of claim 9 wherein said cross member includes means for enabling attachment of an article thereto.

12. The display case of claim 9 further including mounting means.

13. The display case of claim 8 wherein said display case includes handle means for transportation thereof.

14. A display case comprising:
first and second generally identical display portions which, when joined together form an enclosure with an open end and at least one display opening;
first and second generally identically configured span rail members, said first rail member being configured for closing said opening and said second rail member being configured for being received within said enclosure in spaced relation with said first member for forming a compartment;
said display case includes two display openings and a cross member secured to the periphery of one of said openings; and
wherein said cross-member includes a hub configured for receiving thereover the aperture of a disc means.

15. The display case of claim 14 wherein said disc means is a record.

16. A display case comprising:
first and second generally identical display portions which, when joined together form an enclosure with an open end and at least one display opening;
first and second generally identically configured span rail members, said first rail member being configured for closing said opening and said second rail member being configured for being received within said enclosure in spaced relation with said first member for forming a compartment;
said display case includes two display openings and a cross member secured to the periphery of one of said openings; and
handle means secured to one of said span rail members for transportation of said case.

17. A display case comprising:
first and second generally identical display case halves which when joined together form an enclosure with a display opening;
each of said display case half includes a peripheral edge portion in facing relation with the like edge portion of the other half, said edge portions including matingly coacting pegs and apertures, alternately positioned, or located, so that when said pegs and apertures are keyed, one to the other, an enclosure is formed with an aligned display opening; and
spaced parallel span rails at one end of said enclosure which define a compartment into which illumination means may be inserted for illuminating the display area.

18. The display case of claim 17 further including a centrally located cross member having a hub for receiving a display article thereon.

19. The display case of claim 18 further including a handle for portability mounted exterior of said compartment.

* * * * *